US012783228B2

(12) United States Patent
Lazar et al.

(10) Patent No.: US 12,783,228 B2
(45) Date of Patent: Nov. 3, 2026

(54) SELECTING AND VALIDATING FIRMWARE FOR TELECOMMUNICATIONS SERVERS

(71) Applicant: Dell Products L.P., Round Rock, TX (US)

(72) Inventors: Mihai Lazar, Nepean (CA); Vinay Sawal, Fremont, CA (US); Ramesh Ganapathi, Chennai (IN)

(73) Assignee: Dell Products L.P., Round Rock, TX (US)

( * ) Notice: Subject to any disclaimer, the term of this patent is extended or adjusted under 35 U.S.C. 154(b) by 162 days.

(21) Appl. No.: 18/796,169

(22) Filed: Aug. 6, 2024

(65) Prior Publication Data

US 2026/0044332 A1 Feb. 12, 2026

(51) Int. Cl.
*G06F 8/65* (2018.01)

(52) U.S. Cl.
CPC .................................... *G06F 8/65* (2013.01)

(58) Field of Classification Search
CPC ........................................................ G06F 8/65
See application file for complete search history.

(56) References Cited

U.S. PATENT DOCUMENTS

| | | | | |
|---|---|---|---|---|
| 10,977,367 | B1 * | 4/2021 | Adler | G06F 21/568 |
| 11,474,803 | B2 | 10/2022 | Su et al. | |
| 2014/0189673 | A1 * | 7/2014 | Stenfort | G06F 8/654 717/170 |
| 2021/0004000 | A1 | 1/2021 | Kalaskar et al. | |
| 2022/0075613 | A1 | 3/2022 | Ramachandran et al. | |
| 2022/0164196 | A1 * | 5/2022 | Beckett | G06F 9/30079 |
| 2023/0177349 | A1 | 6/2023 | Balakrishnan et al. | |

(Continued)

FOREIGN PATENT DOCUMENTS

| | | | | | |
|---|---|---|---|---|---|
| CN | 112751699 | A | * | 5/2021 | G06F 8/65 |
| CN | 114090054 | A | * | 2/2022 | G06F 8/658 |
| EP | 4492225 | A1 | * | 1/2025 | H02J 13/10 |

OTHER PUBLICATIONS

Non Final Office Action received for U.S. Appl. No. 18/660,875 dated Jun. 29, 2026, 17 pages.

(Continued)

*Primary Examiner* — Phillip H Nguyen
(74) *Attorney, Agent, or Firm* — Amin, Turocy & Watson, LLP

(57) ABSTRACT

A system can identify respective anonymized results of respective firmware upgrades of respective computer systems resulting from performing respective instances of federated learning on the respective computer systems. The system can aggregate the anonymized results to produce aggregated results. The system can identify software operating on a computer system, firmware components of the computer system that are to be upgraded, and a type of the computer system. The system can input the software, the firmware components, and the type to a trained machine learning model, to produce an output that indicates one or more respective firmware components of the computer system to upgrade with one or respective more firmware types, wherein the trained machine learning model was trained with the aggregated results. The system can upgrade the one or more firmware components of the computer system with the one or more firmware types based on the output.

20 Claims, 11 Drawing Sheets

(56) References Cited

U.S. PATENT DOCUMENTS

| | | | |
|---|---|---|---|
| 2023/0189319 | A1 | 6/2023 | Akdeniz et al. |
| 2023/0195451 | A1* | 6/2023 | Shetty .................. G06F 9/4401 717/178 |
| 2023/0259634 | A1 | 8/2023 | Ahmed et al. |
| 2023/0385091 | A1 | 11/2023 | Ramaswamy et al. |
| 2024/0046147 | A1 | 2/2024 | Galtier et al. |
| 2024/0095012 | A1* | 3/2024 | Jain .......................... G06F 8/65 |
| 2024/0155025 | A1 | 5/2024 | Akdeniz et al. |
| 2024/0273379 | A1 | 8/2024 | Da Silva et al. |
| 2024/0338193 | A1 | 10/2024 | Bhupati et al. |
| 2024/0345554 | A1* | 10/2024 | Brown .................. G05B 15/02 |
| 2025/0220031 | A1 | 7/2025 | Derbeko et al. |
| 2025/0335550 | A1 | 10/2025 | Ahmed |
| 2025/0348302 | A1 | 11/2025 | Ganapathi et al. |
| 2025/0348303 | A1 | 11/2025 | Lazar et al. |

OTHER PUBLICATIONS

Non Final Office Action received for U.S. Appl. No. 18/660,910 dated Jul. 1, 2026, 11 pages.

* cited by examiner

SELECTING AND VALIDATING FIRMWARE FOR TELECOMMUNICATIONS SERVERS

BACKGROUND

Telecommunications servers can comprise firmware.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify respective anonymized results of respective firmware upgrades of respective computer systems resulting from performing respective instances of federated learning on the respective computer systems. The system can aggregate the anonymized results to produce aggregated results. The system can identify software operating on a computer system, firmware components of the computer system that are to be upgraded, and a type of the computer system. The system can input the software, the firmware components, and the type to a trained machine learning model, to produce an output that indicates one or more respective firmware components of the computer system to upgrade with one or respective more firmware types, wherein the trained machine learning model was trained with the aggregated results. The system can upgrade the one or more firmware components of the computer system with the one or more firmware types based on the output.

An example method can comprise identifying, by a system comprising at least one processor, software operating on a computer system, firmware components of the computing system that are to be upgraded, and a type of the computing system. The method can further comprise inputting, by the system, the software, the firmware components, and the type to a trained machine learning model, to produce an output that indicates one or more respective firmware components of the computer system to upgrade with one or respective more firmware types, wherein the trained machine learning model was trained with respective anonymized results of respective firmware upgrades of respective computer systems from performing respective instances of federated learning on the respective computer systems. The method can further comprise initiating upgrading, by the system, the one or more firmware components of the computer system with the one or more firmware types based on the output.

An example non-transitory computer-readable medium can comprise instructions that, in response to execution, cause a system comprising a processor to perform operations. These operations can comprise identifying software operating on computer equipment, firmware components of the computing equipment that are to be upgraded, and a type of the computing system. These operations can further comprise providing the software, the firmware components, and the type as input to a trained machine learning model, to produce an output that indicates one or more firmware upgrades to perform on the computing equipment to upgrade with one or respective more firmware types. These operations can further comprise initiating upgrading, by the system, the one or more firmware upgrades for the computing equipment with the one or more firmware types based on the output.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
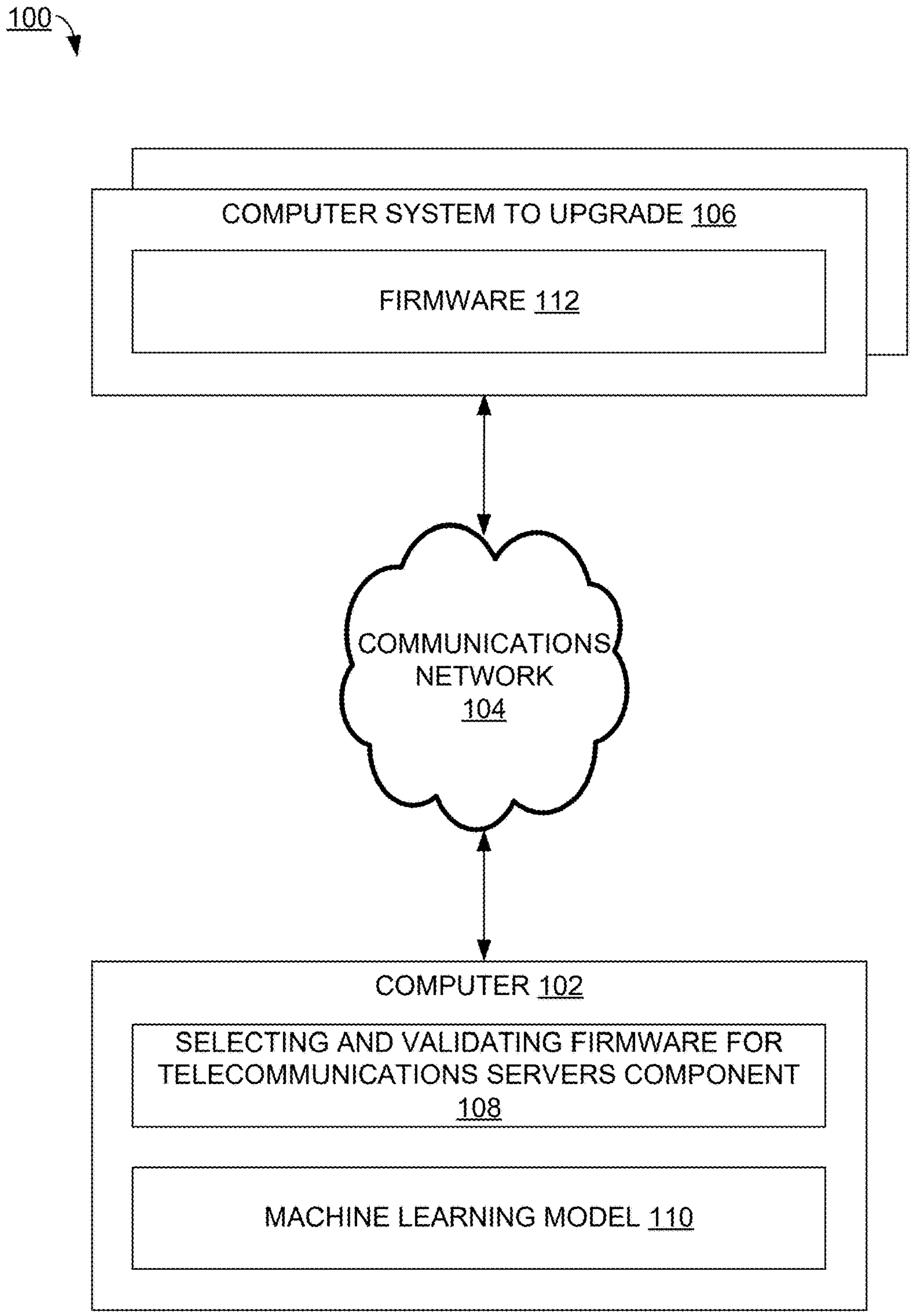
FIG. 1 illustrates an example system architecture that can facilitate selecting and validating firmware for telecommunications servers, in accordance with an embodiment of this disclosure.

The examples herein generally relate to fifth generation (5G) broadband cellular networks. It can be appreciated that the present techniques can be applied to other types of networks, such as Long-Term Evolution (LTE) or sixth generation (6G) broadband cellular networks.

Hardware deployments for 5G cellular networks, both for a 5G Core network and a Radio Access Network (RAN), can make use of off-the-shelf compute servers for executing containerized 5G workloads. For instance, a gNodeB (gNB, which can comprise a 5G base station) can use multiple servers and/or server clusters to realize centralized unit (CU) and distributed unit (DU) functionality.

A typical deployment can include thousands of servers, deployed at various locations (data centers, cell-sites, etc.) that are interconnected through network links of various characteristics such as throughput, bandwidth, latency, reliability, etc.

Servers can be characterized by their hardware attributes (compute power/central processing unit (CPU), memory size, storage size, network bandwidth, etc.) and software lineup. In certain cases, telecommunications (telco) deployments can comprise a heterogenous set of servers, with different hardware (HW) and software (SW) characteristics.

A software lineup of a server can comprise firmware, such as a basic input/output system (BIOS), device drivers, device firmware (for storage, network interface cards, etc.), and a run-time platform (e.g., an operating system (OS), and/or a containerized application platform). A software lineup of a server can also comprise 5G application software.

While deploying new SW or upgrading SW, telcos can use a continuous integration/continuous deployment (CI/CD) pipeline to perform the initial deployment, testing, and upgrades of the production environment. It can be that service level agreement (SLA) parameters cannot be affected.

Software and firmware components can be provided by many vendors. Application SW vendors can perform their validation on a given SW lineup.

There can be various problems associated with configuring hardware deployments for 5G cellular networks. A problem can relate to selecting a particular firmware for a given type of server model, which can involve feasibility/compatibility checks, and can require a significant number of interactions between various entities.

Another problem can relate to selecting the right firmware version among the available versions for the current workloads/applications, which can require extensive validations.

Another problem can relate to validating a firmware compatibility matrix along with application requirements, which can involve multiple rounds of validations and take a significant amount of time and effort. This process can be iterative, where a tentative firmware "lineup" is initially selected based on input from multiple sources, validated, then changed if the validation fails, etc.

Another problem can relate to firmware, where it can be that upgrades are not simple. In some examples, multiple firmware components can need to be upgraded in multiple steps.

Another problem can relate to upgrades, which can be performed in a production environment only after validating them in the staging environment, which can result in significant effort for customer information technology (IT) administrators.

The present techniques can be implemented to address these problems with prior approaches. The present techniques can facilitate a fully-automated firmware selection and validation technique that incorporates an artificial intelligence (AI)-driven approach, and utilizes CI/CD automation methodology. In some examples, the present techniques can integrate with a Platform-as-a-Service (PaaS) to create a multi-vendor firmware selection & validation workflow.

In some examples, a component can detect the firmware updates for the given server in a cluster and find the list of firmware to be updated based on priority. For instance, firmware with security vulnerability fixes can be given precedence over normal firmware update. A latest firmware compatibility matrix can be maintained per workload vendor based on validation/dry run results or vendor's recommendation. A "server hardware as a service" can be used to perform validation of the determined firmware(s) in the servers with the workloads representing the production environment, benchmark it for an amount of time, and compare the performance results with the actual production environment to ensure the latest firmware is compatible with the workloads. Based on the qualification results the latest best-matched firmware(s) can be derived for the servers in the cluster.

The present techniques can be implemented to facilitate an AI-driven, automatic determination of firmware(s) compatibility between different firmware components for a given application workload environment, and generate a firmware lineup for a given server type and BOM.

The present techniques can also be implemented to facilitate a multi-tenant validation staging environment that incorporates AI federated learning to anonymize data and use intermediate results provided from various field deployments and customers.

The present techniques can offer various benefits, such as an automated firmware components selection and validation process; privacy preservation and bandwidth efficiency—e.g., not streaming the full data from edge servers/deployments; savings in capital expenditures (CAPEX) and operating expenditures (OPEX) as this can facilitate fully automated infrastructure; and participating users can access a multi-vendor validation and interoperability center, and benefit from other users'data.

EXAMPLE ARCHITECTURES

FIG. 1 illustrates an example system architecture 100 that can facilitate selecting and validating firmware for telecommunications servers, in accordance with an embodiment of this disclosure.

System architecture 100 comprises computer 102, communications network 104, and computer system to upgrade 106. In turn, computer 102 comprises selecting and validating firmware for telecommunications servers component 108, and machine learning model 110. And computer system to upgrade 106 comprises firmware 112.

Figure 11:
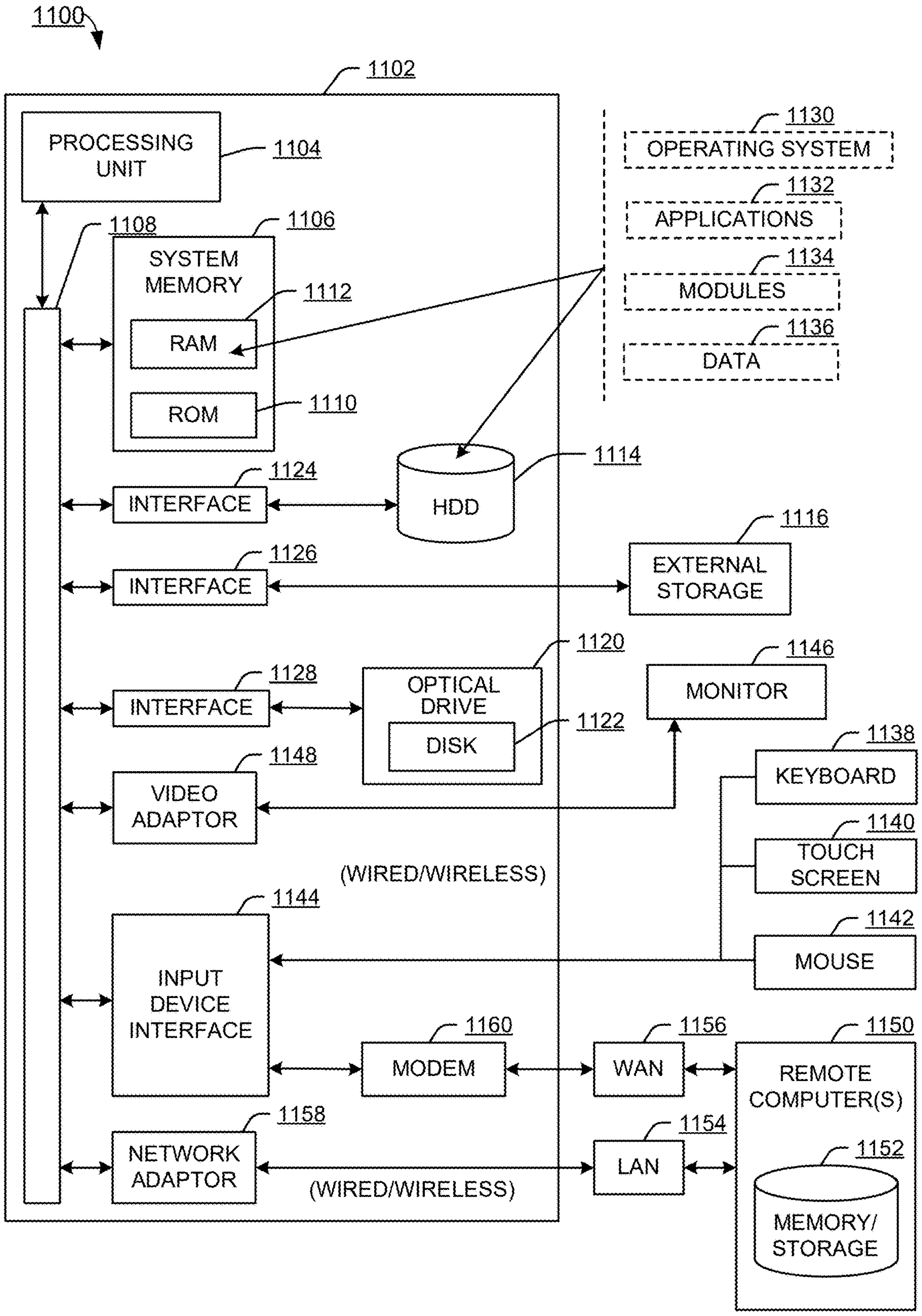
FIG. 11 illustrates an example block diagram of a computer operable to execute an embodiment of this disclosure.

Each of computer 102 and/or computer system to upgrade 106 can be implemented with part(s) of computing environment 1100 of FIG. 11. Communications network 104 can comprise a computer communications network, such as the Internet, or an isolated private computer communications network.

Computer system to upgrade 106 can comprise one or more computers for which at least some firmware is to be upgraded. In some examples, computer system to upgrade 106 can comprise telecommunications servers, such as those that facilitate broadband cellular communications with user equipment.

Computer system to upgrade 106 can be communicatively coupled to computer 102 via communications network 104. Computer 102 can receive an indication to select and validate firmware for an upgrade of computer system to upgrade 106, where at least some of firmware 112 is to be upgraded. This can comprise selecting an order of operations of the upgrade, producing a bill of materials for the upgrade, estimating a duration of the upgrade, and estimating an amount of computer downtime of the upgrade. And this can be done for each of one or more computers of computer system to upgrade 106.

Selecting and validating firmware for telecommunications servers component 108 can facilitate this process by inputting information about the upgrade to machine learning model 110, which can output information related to the upgrade.

In some examples, selecting and validating firmware for telecommunications servers component 108 can implement part(s) of the process flows of FIGS. 4-10 to facilitate selecting and validating firmware for telecommunications servers.

It can be appreciated that system architecture 100 is one example system architecture for selecting and validating firmware for telecommunications servers, and that there can be other system architectures that facilitate selecting and validating firmware for telecommunications servers.

Figure 2:
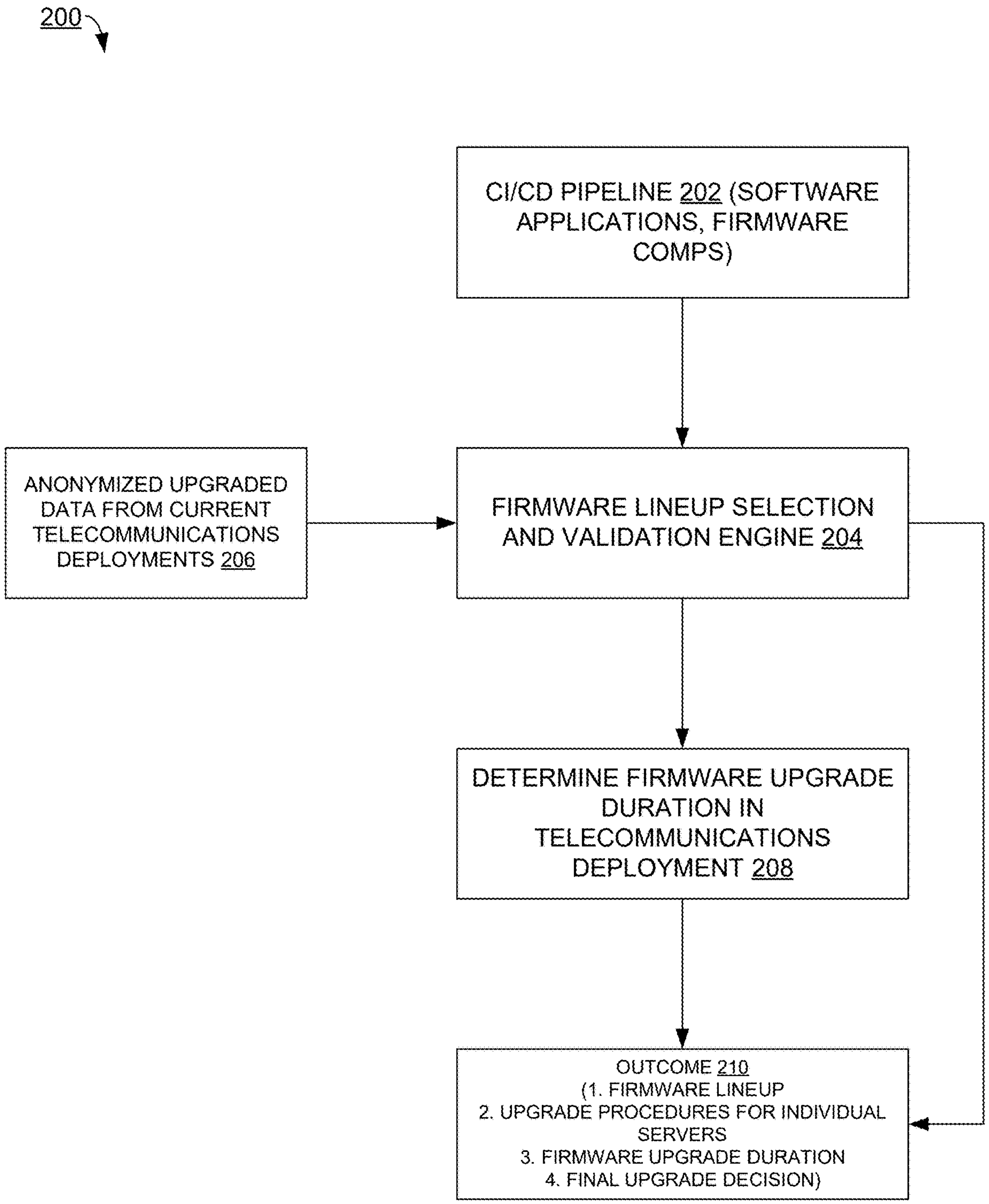
FIG. 2 illustrates another example system architecture that can facilitate selecting and validating firmware for telecommunications servers, in accordance with an embodiment of this disclosure.

FIG. 2 illustrates another example system architecture 200 that can facilitate selecting and validating firmware for telecommunications servers, in accordance with an embodiment of this disclosure. In some examples, part(s) of system architecture 200 can be used to implement part(s) of system architecture 100 of FIG. 1 to facilitate selecting and validating firmware for telecommunications servers.

System architecture 200 comprises CI/CD pipeline 202 (software applications, firmware comps), firmware lineup selection and validation engine 204, anonymized upgraded data from current telecommunications deployments 206, determine firmware upgrade duration in telecommunications deployment 208, and outcome 210 (1. firmware lineup, 2. upgrade procedures for individual servers, 3. firmware upgrade duration, 4. final upgrade decision).

The following components are depicted in FIG. 2.

- CI/CD pipeline 202: This can comprise an automated pipeline to stage firmware and software components.
- Anonymized upgraded data from current telecommunications deployments 206: This can comprise data that is fed into a selection and validation engine, which can provide anonymized information about upgrade results, tenant deployments, etc. from various telco deployments.
- Firmware lineup selection and validation engine 204: This can process input data and produce a lineup of firmware components compatible with the existing set of SW applications executed on a given server type. The lineup selection can be based on:
  - SW and firmware (FW) compatibility of existing SW application and FW components to be upgraded;
  - Input from testing executed by multiple vendors (which can be anonymized);
  - Priority of security patches before upgrade results; and
  - Upgrade statistics.
- Determine firmware upgrade duration in telecommunications deployment 208: This can determine a total duration of an upgrade process for individual servers, and can be based on the duration, order, and dependencies of each step involved in the upgrade.
- Outcome 210: This can comprise a decision to upgrade or not. In addition to the firmware lineup, an upgrade script and an estimate of the duration of the upgrade process and total server downtime can be determined.

Firmware lineup selection and validation engine 204 can generally perform training and inferencing. Firmware lineup selection and validation engine 204 can be trained with anonymized results (e.g., SW and FW lineups, logs, and success/fail results) from prior upgrades at multiple sites, information about SW and FW compatibility, server type and characteristics.

At inference time, the engine can be provided with information about SW and FW compatibility, priority of security patches and the type and characteristics of the server to upgrade, and produce a FW lineup, which can be considered a FW lineup that is considered to be most likely successful FW lineup.

Figure 3:
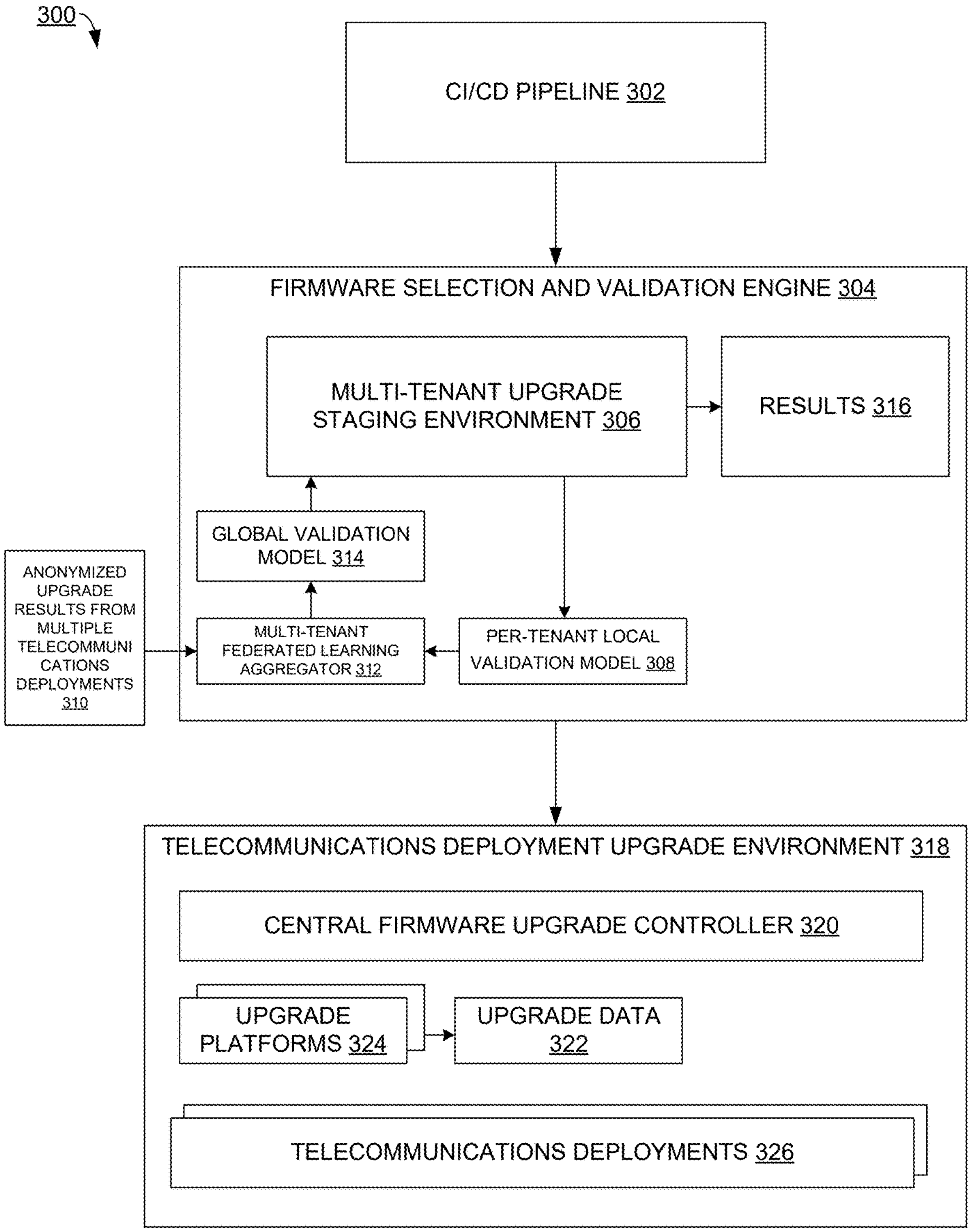
FIG. 3 illustrates another example system architecture that can facilitate selecting and validating firmware for telecommunications servers, in accordance with an embodiment of this disclosure.

FIG. 3 illustrates another example system architecture 300 that can facilitate selecting and validating firmware for telecommunications servers, in accordance with an embodiment of this disclosure. In some examples, part(s) of system architecture 300 can be used to implement part(s) of system architecture 100 of FIG. 1 to facilitate selecting and validating firmware for telecommunications servers.

System architecture 300 comprises CI/CD pipeline 302, firmware selection and validation engine 304, multi-tenant upgrade staging environment 306, per-tenant local validation model 308, anonymized upgrade results from multiple telecommunications deployments 310, multi-tenant federated learning aggregator 312, global validation model 314, results 316, telecommunications deployment upgrade environment 318, central firmware upgrade controller 320, upgrade data 322, upgrade platforms 324, and telecommunications deployments 326.

FIG. 3 comprises an example system architecture that can facilitate implementing the present techniques. A firmware selection and validation engine can make use of federated learning techniques to derive the following results: (a) firmware lineup; (b) estimate of firmware upgrade duration; and (c) upgrade scripts for individual servers.

The present techniques can be implemented with a CI/CD pipeline engine in which 5G software applications are provided along with firmware components that can be executed in multiple tenant environments.

For each tenant execution, the model/behavior of the firmware upgrade can be learned using a local AI model. These local tenant models can be specific to a server type and bill of materials (BOM) used in the deployment for each tenant's solution.

The output of each local tenant model can be fed to a multi-tenant federated learning aggregator.

A firmware lineup generated can be for a server type and a BOM, which can comprise:

- processor type;
- storage controller;
- BIOS;
- an integrated out-of-band management platform controller; and
- network interface cards (NICs).

The Aggregator can use the anonymized firmware upgrade results from each 5G deployment and derives aggregated results. A global AI validation model can continuously be fed in with these results to improve efficiency and outcome. The results can be fed into an automated 5G telco deployment server upgrade environment for real-time automated firmware upgrade.

EXAMPLE PROCESS FLOWS

Figure 4:
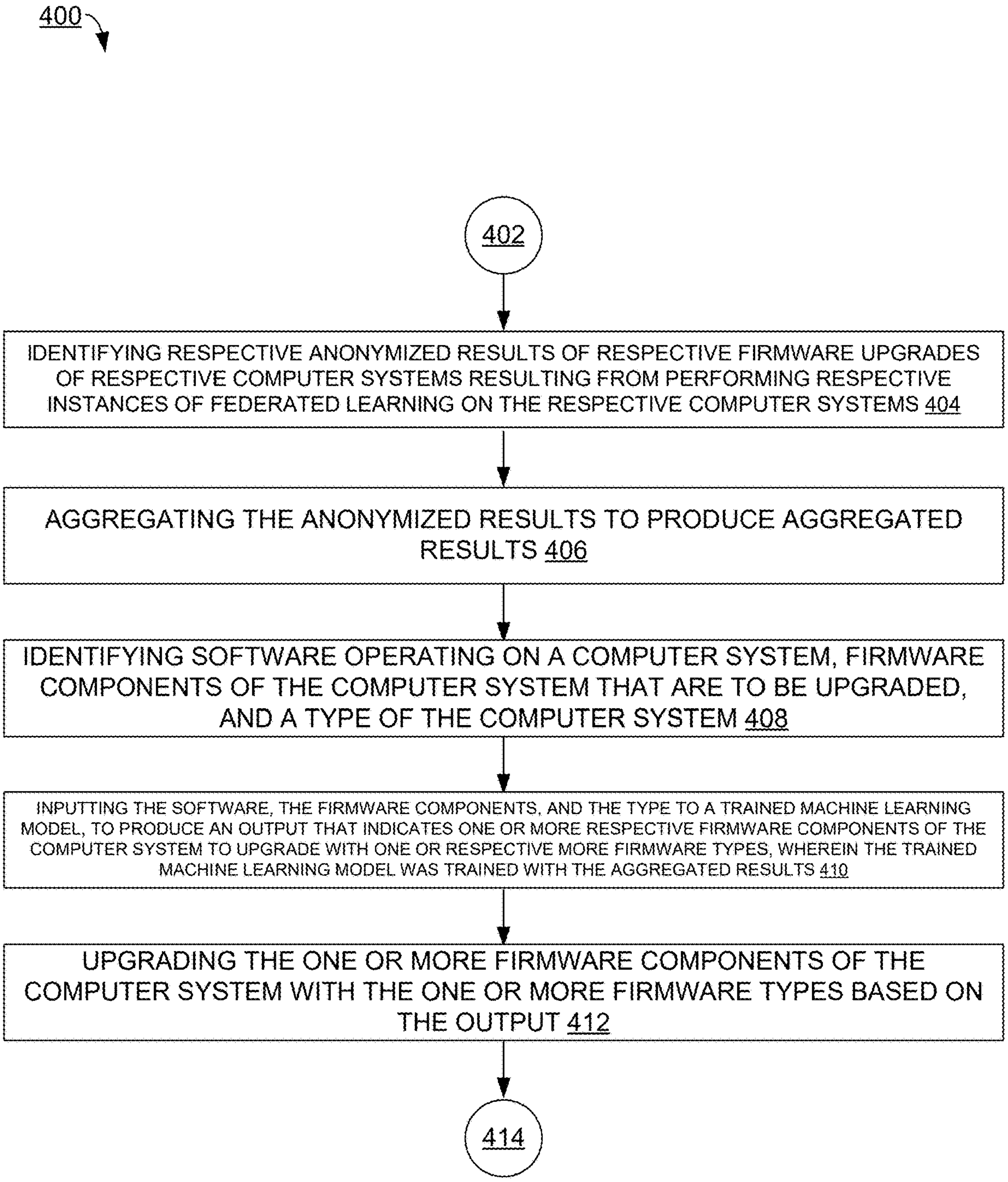
FIG. 4 illustrates an example process flow that can facilitate selecting and validating firmware for telecommunications servers, in accordance with an embodiment of this disclosure.

FIG. 4 illustrates an example process flow 400 for selecting and validating firmware for telecommunications servers, in accordance with an embodiment of this disclosure. In some examples, one or more embodiments of process flow 400 can be implemented by system architecture 100 of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404.

Operation 404 depicts identifying respective anonymized results of respective firmware upgrades of respective computer systems resulting from performing respective instances of federated learning on the respective computer systems. That is, anonymized results of firmware updates can be gathered.

After operation 404, process flow 400 moves to operation 406.

Operation 406 depicts aggregating the anonymized results to produce aggregated results. That is, the results of operation 404 can be aggregated.

After operation 406, process flow 400 moves to operation 408.

Operation 408 depicts identifying software operating on a computer system, firmware components of the computer system that are to be upgraded, and a type of the computer system. That is, a current system to upgrade can be identified, including its software, server type, and what firmware it has.

In some examples, the firmware components comprise a basic input output system, a device driver, a device firmware, or a runtime platform.

After operation 408, process flow 400 moves to operation 410.

Operation 410 depicts inputting the software, the firmware components, and the type to a trained machine learning model, to produce an output that indicates one or more respective firmware components of the computer system to upgrade with one or respective more firmware types, wherein the trained machine learning model was trained with the aggregated results. That is, a trained model can be input with the information of operation 408 to determine how to upgrade the current system.

In some examples, the one or more firmware types are determined to be compatible with the software. In some examples, the one or more firmware types are determined to be compatible with the type of the computer system. That is, input data can be processed to produce an output that comprises a lineup of firmware components that are compatible with existing software applications that are executed on a given server type.

In some examples, the output indicates a respective duration of performing the upgrading of the one or more firmware components of the computer system. That is, a total duration of an upgrade process for individual servers can be determined, based on a duration, order, and dependencies of each step involved in an upgrade.

In some examples, the output indicates an upgrade script for the computer system to facilitate the upgrading of the one or more firmware components of the computer system. In some examples, the computer system comprises a group of computers, and the output indicates respective upgrade scripts for respective computers of the group of computers to facilitate the upgrading of the one or more firmware components of the computer system. That is, in addition to a firmware lineup, an output can comprise an upgrade script (for one or more servers).

After operation 410, process flow 400 moves to operation 412.

Operation 412 depicts upgrading the one or more firmware components of the computer system with the one or more firmware types based on the output. That is, the upgrade identified in operation 410 can be carried out.

After operation 412, process flow 400 moves to 414, where process flow 400 ends.

Figure 5:
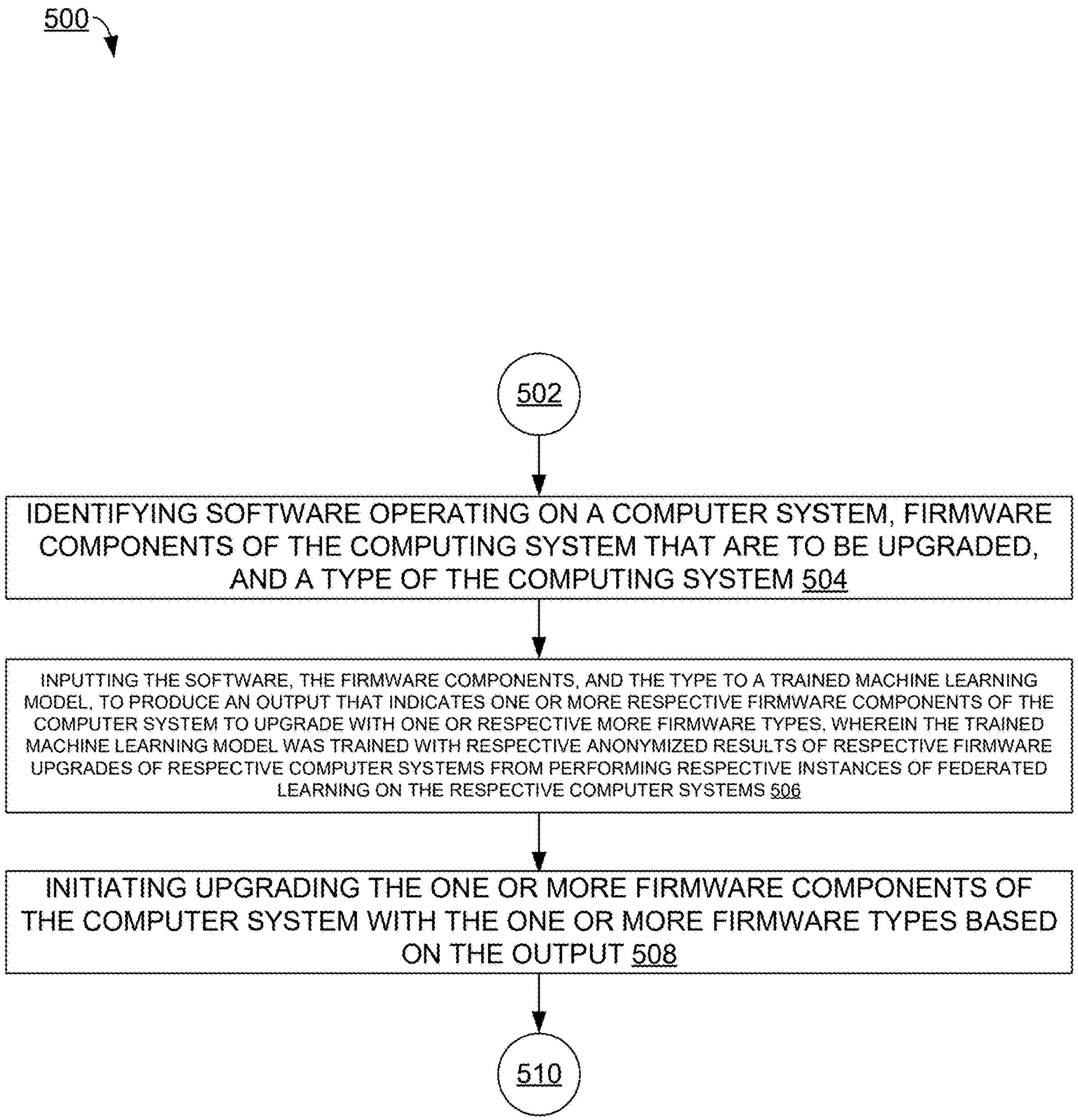
FIG. 5 illustrates another example process flow that can facilitate selecting and validating firmware for telecommunications servers, in accordance with an embodiment of this disclosure.

FIG. 5 illustrates an example process flow 500 for selecting and validating firmware for telecommunications servers, in accordance with an embodiment of this disclosure. In some examples, one or more embodiments of process flow 500 can be implemented by system architecture 100 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504.

Operation 504 depicts identifying software operating on a computer system, firmware components of the computing system that are to be upgraded, and a type of the computing system. In some examples, operation 504 can be implemented in a similar manner as operation 408 of FIG. 4.

After operation 504, process flow 500 moves to operation 506.

Operation 506 depicts inputting the software, the firmware components, and the type to a trained machine learning model, to produce an output that indicates one or more respective firmware components of the computer system to upgrade with one or respective more firmware types, wherein the trained machine learning model was trained with respective anonymized results of respective firmware upgrades of respective computer systems from performing respective instances of federated learning on the respective computer systems. In some examples, operation 506 can be implemented in a similar manner as operations 404-406 and 410 of FIG. 4.

In some examples, the output indicates an order of operations of performing the upgrading of the one or more firmware components, and the order of operations is based on a priority of firmware updates. In some examples, the priority of firmware updates is based on whether respective firmware updates of the firmware updates comprise respective security vulnerability fixes. That is, firmware updates for a given server in a cluster can be detected, and a list of firmware to be updated based on priority can be determined. For instance, firmware with security vulnerability fixes can be given precedence over a normal firmware update.

After operation 506, process flow 500 moves to operation 508.

Operation 508 depicts initiating upgrading the one or more firmware components of the computer system with the one or more firmware types based on the output. In some examples, operation 508 can be implemented in a similar manner as operation 412 of FIG. 4.

In some examples, the inputting and the upgrading are performed as part of a continuous integration and continuous deployment pipeline.

After operation 508, process flow 500 moves to 510, where process flow 500 ends.

Figure 6:
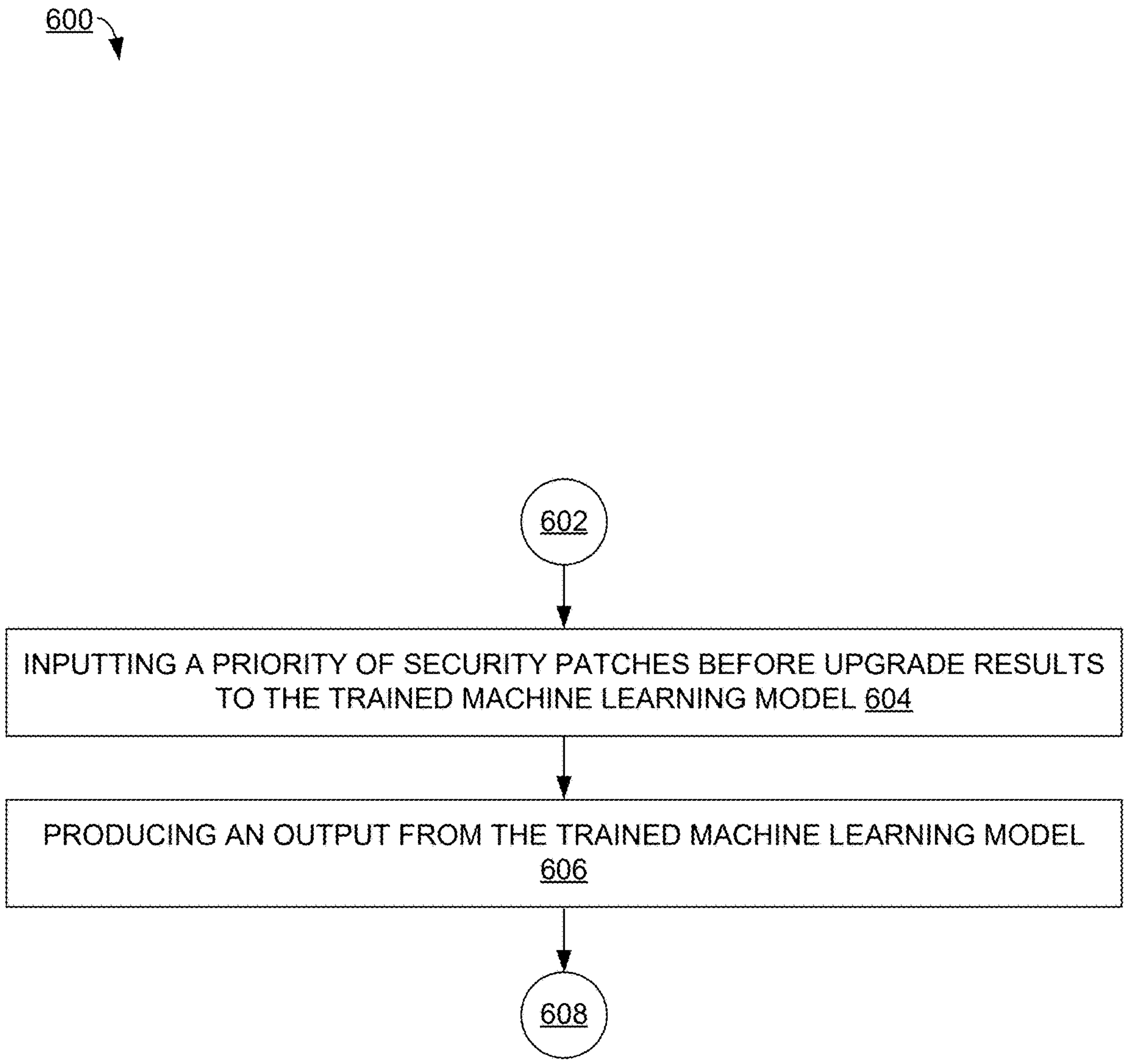
FIG. 6 illustrates another example process flow that can facilitate selecting and validating firmware for telecommunications servers, in accordance with an embodiment of this disclosure.

FIG. 6 illustrates an example process flow 600 for selecting and validating firmware for telecommunications servers, in accordance with an embodiment of this disclosure. In some examples, one or more embodiments of process flow 600 can be implemented by system architecture 100 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts inputting a priority of security patches before upgrade results to the trained machine learning model. In some examples, a selection and validation engine can process input data and produce a lineup of firmware components that are compatible with an existing group of software applications executed on a given server type. The lineup selection can be based on a priority of security patches before upgrade results.

After operation 604, process flow 600 moves to operation 606.

Operation 606 depicts producing an output from the trained machine learning model. Using the example of FIG. 1, this can be machine learning model 110.

In some examples, operations 604-606 can be combined to be expressed as, inputting a priority of security patches before upgrade results to the trained machine learning model, to produce the output.

After operation 606, process flow 600 moves to 608, where process flow 600 ends.

Figure 7:
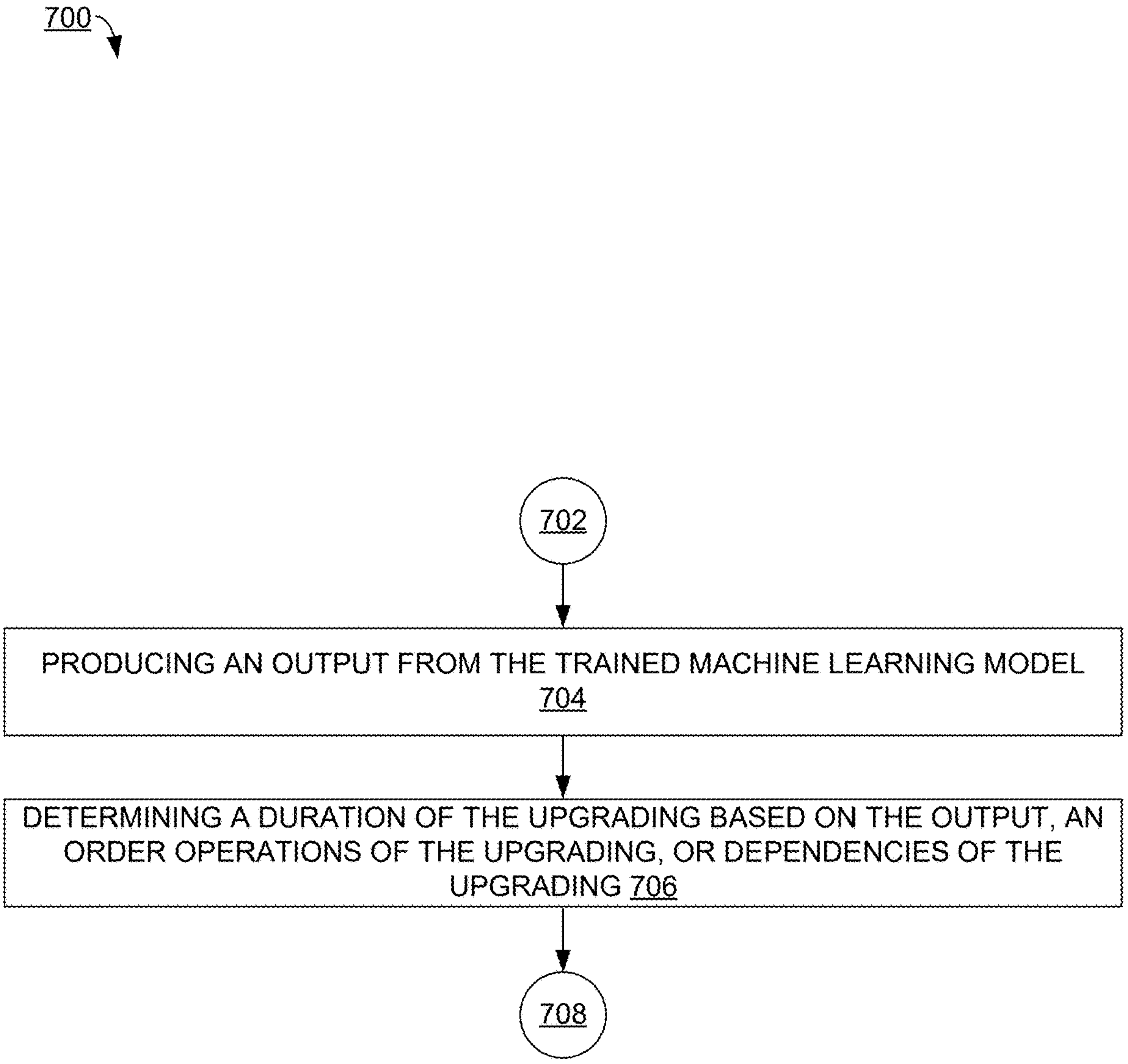
FIG. 7 illustrates another example process flow that can facilitate selecting and validating firmware for telecommunications servers, in accordance with an embodiment of this disclosure.

FIG. 7 illustrates an example process flow 700 for selecting and validating firmware for telecommunications servers, in accordance with an embodiment of this disclosure. In some examples, one or more embodiments of process flow 700 can be implemented by system architecture 100 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts producing an output from the trained machine learning model. Using the example of FIG. 1, this can be machine learning model 110.

After operation 704, process flow 700 moves to operation 706.

Operation 706 depicts determining a duration of the upgrading based on the output, an order of operations of the upgrading, or dependencies of the upgrading. That is, a total duration of an upgrade process for individual servers can be determined, based on a duration, order, and dependencies of the steps of the upgrade.

After operation 706, process flow 700 moves to 708, where process flow 700 ends.

Figure 8:
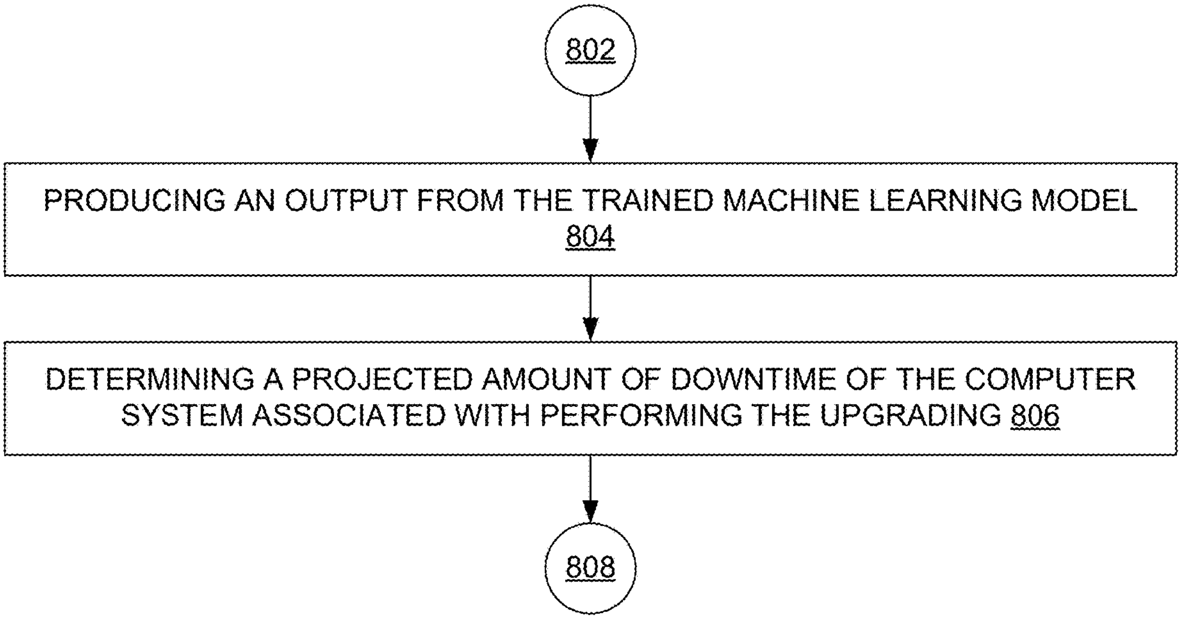
FIG. 8 illustrates another example process flow that can facilitate selecting and validating firmware for telecommunications servers, in accordance with an embodiment of this disclosure.

FIG. 8 illustrates an example process flow 800 for selecting and validating firmware for telecommunications servers, in accordance with an embodiment of this disclosure. In some examples, one or more embodiments of process flow 800 can be implemented by system architecture 100 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 800 begins with 802, and moves to operation 804.

Operation 804 depicts producing an output from the trained machine learning model. Using the example of FIG. 1, this can be machine learning model 110.

After operation 804, process flow 800 moves to operation 806.

Operation 806 depicts determining a projected amount of downtime of the computer system associated with performing the upgrading. In some examples, in addition to a firmware lineup, an upgrade script can be generated along with an estimate of a duration of the upgrade process, and of a total server downtime.

After operation 806, process flow 800 moves to 808, where process flow 800 ends.

Figure 9:
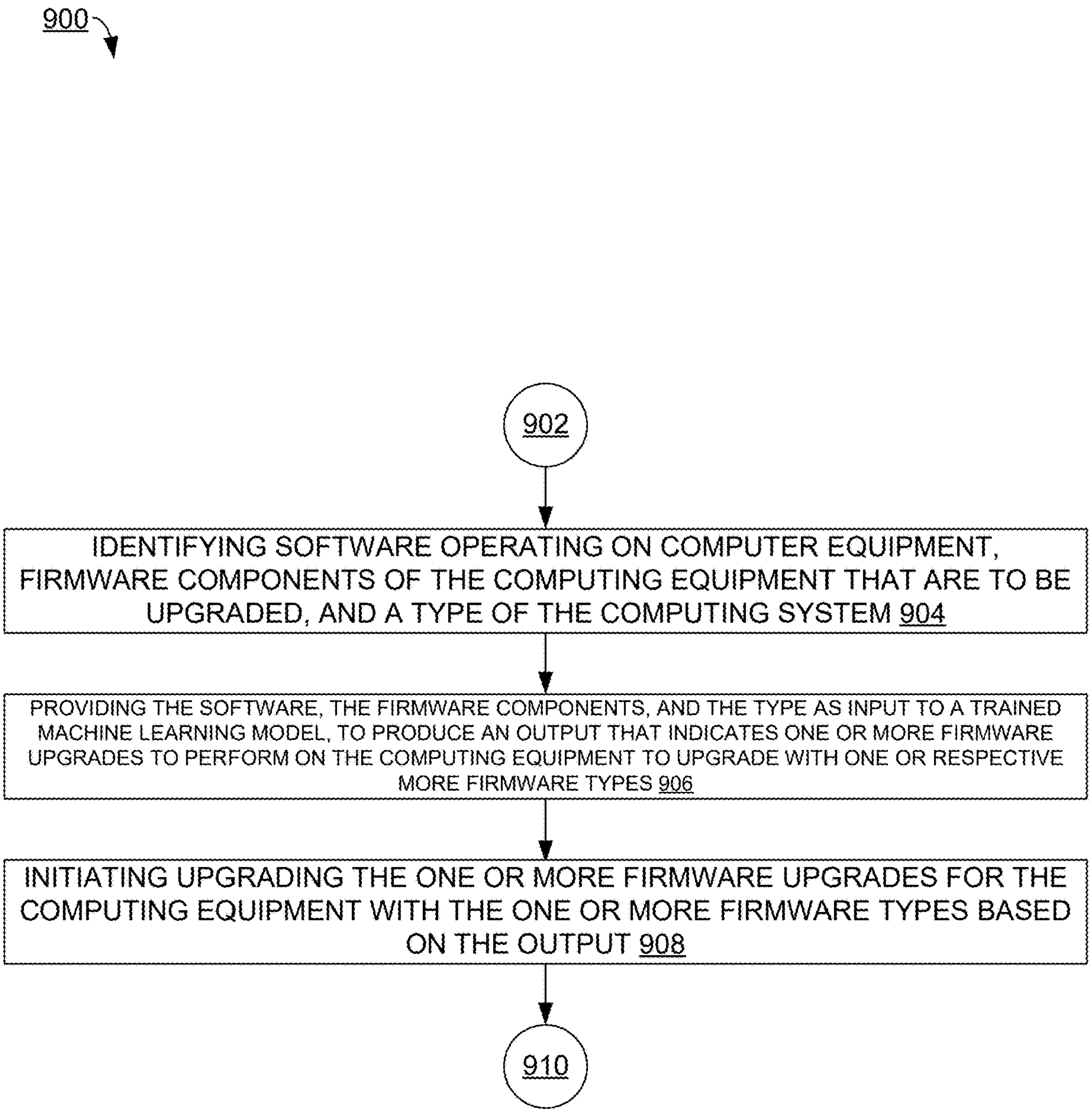
FIG. 9 illustrates another example process flow that can facilitate selecting and validating firmware for telecommunications servers, in accordance with an embodiment of this disclosure.

FIG. 9 illustrates an example process flow 900 for selecting and validating firmware for telecommunications servers, in accordance with an embodiment of this disclosure. In some examples, one or more embodiments of process flow 900 can be implemented by system architecture 100 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 900 begins with 902, and moves to operation 904.

Operation 904 depicts identifying software operating on computer equipment, firmware components of the computing equipment that are to be upgraded, and a type of the computing system. In some examples, operation 904 can be implemented in a similar manner as operations 408 of FIG. 4.

In some examples, the computer equipment comprises a multi-tenant environment, and respective computing equipment comprise respective multi-tenant environments.

In some examples, the computer equipment facilitates broadband cellular communications. That is, firmware for a telecommunications server can be upgraded.

After operation 904, process flow 900 moves to operation 906.

Operation 906 depicts providing the software, the firmware components, and the type as input to a trained machine learning model, to produce an output that indicates one or more firmware upgrades to perform on the computing equipment to upgrade with one or respective more firmware types. In some examples, operation 906 can be implemented in a similar manner as operations 404-406 and 410 of FIG. 4.

In some examples, the output comprises a bill of materials for the type of the computing equipment. In some examples, the bill of materials indicates a processor type, a storage controller, a basic input output system, a remote access controller, a network interface card, a complex programmable logic device, a power characteristic of the type of the computing equipment, a memory, a diagnostic information of the type of the computing equipment, or a serial number of the computing equipment.

After operation 906, process flow 900 moves to operation 908.

Operation 908 depicts initiating upgrading the one or more firmware upgrades for the computing equipment with the one or more firmware types based on the output. In some examples, operation 908 can be implemented in a similar manner as operation 412 of FIG. 4.

After operation 908, process flow 900 moves to 910, where process flow 900 ends.

Figure 10:
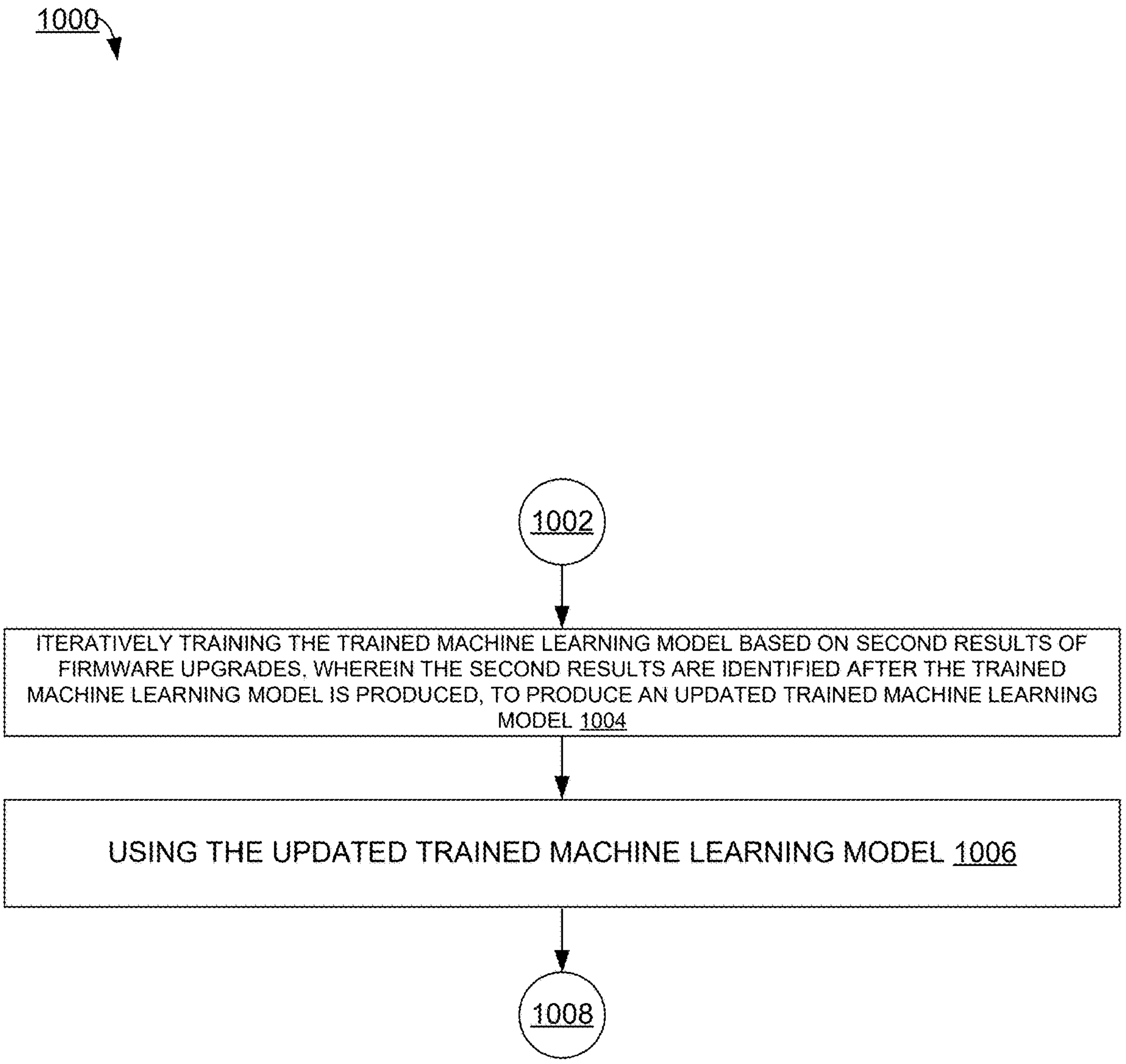
FIG. 10 illustrates another example process flow that can facilitate selecting and validating firmware for telecommunications servers, in accordance with an embodiment of this disclosure.

FIG. 10 illustrates an example process flow 1000 for selecting and validating firmware for telecommunications servers, in accordance with an embodiment of this disclosure. In some examples, one or more embodiments of process flow 1000 can be implemented by system architecture 100 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 500 of FIG. 5, process flow 700 of FIG. 7, process flow 800 of FIG. 8, process flow 1000 of FIG. 10, and/or process flow 1000 of FIG. 10.

Process flow 1000 begins with 1002, and moves to operation 1004.

In some examples, process flow 1000 is implemented in conjunction with process flow 900 of FIG. 9, and the results of respective firmware upgrades are first results of respective firmware.

Operation 1004 depicts iteratively training the trained machine learning model based on second results of firmware upgrades, wherein the second results are identified after the trained machine learning model is produced, to produce an updated trained machine learning model. That is, the trained machine learning model can be repeatedly trained with new results of performing firmware upgrades, to improve the model.

After operation 1004, process flow 1000 moves to operation 1006.

Operation 1006 depicts using the updated trained machine learning model.

After operation 1006, process flow 1000 moves to 1008, where process flow 1000 ends.

EXAMPLE OPERATING ENVIRONMENT

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of computer 102 and/or computer system to upgrade 106 of FIG. 1.

In some examples, computing environment 1100 can implement one or more embodiments of the process flows of FIGS. 4-10 to facilitate selecting and validating firmware for telecommunications servers.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the. NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1116 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

identifying respective anonymized results of respective firmware upgrades of respective computer systems resulting from performing respective instances of federated learning on the respective computer systems;

aggregating the anonymized results to produce aggregated results;

identifying software operating on a computer system, firmware components of the computer system that are to be upgraded, and a type of the computer system;

inputting the software, the firmware components, and the type to a trained machine learning model, to produce an output that indicates one or more respective firmware components of the computer system to upgrade with one or respective more firmware types, wherein the trained machine learning model was trained with the aggregated results; and upgrading the one or more firmware components of the computer system with the one or more firmware types based on the output.

2. The system of claim 1, wherein the one or more firmware types are determined to be compatible with the software.

3. The system of claim 1, wherein the one or more firmware types are determined to be compatible with the type of the computer system.

4. The system of claim 1, wherein the firmware components comprise a basic input output system, a device driver, a device firmware, or a runtime platform.

5. The system of claim 1, wherein the output indicates a respective duration of performing the upgrading of the one or more firmware components of the computer system.

6. The system of claim 1, wherein the output indicates an upgrade script for the computer system to facilitate the upgrading of the one or more firmware components of the computer system.

7. The system of claim 1, wherein the computer system comprises a group of computers, and wherein the output indicates respective upgrade scripts for respective computers of the group of computers to facilitate the upgrading of the one or more firmware components of the computer system.

8. A method, comprising:

identifying, by a system comprising at least one processor, software operating on a computer system, firmware components of the computing system that are to be upgraded, and a type of the computing system;

inputting, by the system, the software, the firmware components, and the type to a trained machine learning model, to produce an output that indicates one or more respective firmware components of the computer system to upgrade with one or respective more firmware types, wherein the trained machine learning model was trained with respective anonymized results of respective firmware upgrades of respective computer systems from performing respective instances of federated learning on the respective computer systems; and initiating upgrading, by the system, the one or more firmware components of the computer system with the one or more firmware types based on the output.

9. The method of claim 8, wherein the inputting and the upgrading are performed as part of a continuous integration and continuous deployment pipeline.

10. The method of claim 8, further comprising:

inputting, by the system, a priority of security patches before upgrade results to the trained machine learning model, to produce the output.

11. The method of claim 8, further comprising:

determining, by the system, a duration of the upgrading based on the output, an order of operations of the upgrading, or dependencies of the upgrading.

12. The method of claim 8, further comprising:

determining, by the system, a projected amount of downtime of the computer system associated with performing the upgrading.

13. The method of claim 8, wherein the output indicates an order of operations of performing the upgrading of the one or more firmware components, and wherein the order of operations is based on a priority of firmware updates.

14. The method of claim 13, wherein the priority of firmware updates is based on whether respective firmware updates of the firmware updates comprise respective security vulnerability fixes.

15. A non-transitory computer-readable medium comprising instructions that, in response to execution, cause a system comprising at least one processor to perform operations, comprising:

identifying software operating on computer equipment, firmware components of the computing equipment that are to be upgraded, and a type of the computing system;

providing the software, the firmware components, and the type as input to a trained machine learning model, to produce an output that indicates one or more firmware upgrades to perform on the computing equipment to upgrade with one or respective more firmware types; and initiating upgrading, by the system, the one or more firmware upgrades for the computing equipment with the one or more firmware types based on the output.

16. The non-transitory computer-readable medium of claim 15, wherein the output comprises a bill of materials for the type of the computing equipment.

17. The non-transitory computer-readable medium of claim 16, wherein the bill of materials indicates a processor type, a storage controller, a basic input output system, a remote access controller, a network interface card, a complex programmable logic device, a power characteristic of the type of the computing equipment, a memory, a diagnostic information of the type of the computing equipment, or a serial number of the computing equipment.

18. The non-transitory computer-readable medium of claim 15, wherein the results of respective firmware upgrades are first results of respective firmware upgrades, and wherein the operations further comprise:

iteratively training the trained machine learning model based on second results of firmware upgrades, wherein the second results are identified after the trained machine learning model is produced.

19. The non-transitory computer-readable medium of claim 15, wherein the computer equipment comprises a multi-tenant environment, and wherein respective computing equipment comprise respective multi-tenant environments.

20. The non-transitory computer-readable medium of claim 15, wherein the computer equipment facilitates broadband cellular communications.

* * * * *